US006628316B1

(12) United States Patent
Spurr et al.

(10) Patent No.: US 6,628,316 B1
(45) Date of Patent: Sep. 30, 2003

(54) PRINTER WITH DONOR AND RECEIVER MEDIA SUPPLY TRAYS EACH ADAPTED TO ALLOW A PRINTER TO SENSE TYPE OF MEDIA THEREIN, AND METHOD OF ASSEMBLING THE PRINTER AND TRAYS

(75) Inventors: Robert W. Spurr, Rochester, NY (US); Kurt M. Sanger, Rochester, NY (US); Babak Tehranchi, Rochester, NY (US); Timothy J. Tredwell, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/667,920

(22) Filed: Sep. 22, 2000

Related U.S. Application Data

(63) Continuation of application No. 09/218,595, filed on Dec. 22, 1998, now abandoned.

(51) Int. Cl.[7] .......................... G01D 15/24; B41J 2/435

(52) U.S. Cl. ........................ 346/134; 347/262; 347/264

(58) Field of Search .......................... 346/134; 347/214, 347/215, 222, 262, 264, 19, 101; 271/265.01; 399/389

(56) References Cited

U.S. PATENT DOCUMENTS

| | | | |
|---|---|---|---|
| 4,663,625 | A | 5/1987 | Yewen |
| 4,742,470 | A | 5/1988 | Juengel |
| 4,806,958 | A | 2/1989 | Momot et al. |
| 5,008,661 | A | 4/1991 | Raj |
| 5,019,815 | A | 5/1991 | Lemelson et al. |
| 5,049,898 | A | 9/1991 | Arthur et al. |
| 5,049,904 | A | 9/1991 | Nakamura et al. |
| 5,053,814 | A | 10/1991 | Takano et al. |
| 5,078,523 | A | 1/1992 | McGourty et al. |
| 5,104,247 | A | 4/1992 | Ohshima |
| 5,105,190 | A | 4/1992 | Kip et al. |
| 5,184,152 | A | 2/1993 | French |

(List continued on next page.)

FOREIGN PATENT DOCUMENTS

| | | |
|---|---|---|
| NL | 9400392 | 3/1994 |

OTHER PUBLICATIONS

Spurr et al., application No. 09/767,624, Entitled: A Printer Media Supply Spool Adapted to Allow the Printer to Sense Type of Media, and Method of Assembling Same, Dated: Jan. 23, 2001.

(List continued on next page.)

*Primary Examiner*—Hai Pham
(74) *Attorney, Agent, or Firm*—Roland R. Schindler, II

(57) ABSTRACT

A printer with donor and receiver media supply trays each adapted to allow a printer to sense type of media therein, and method of assembling the printer and trays. Donor and receiver media supply trays to be loaded into the printer are adapted to allow the printer to sense type of media therein. Each supply tray comprises a tray body having a supply of the media (i.e., donor or receiver) therein. A transceiver is disposed proximate the trays. The transceiver is capable of transmitting a first electromagnetic field and sensing a second electromagnetic field A first transponder is integrally connected to the receiver supply tray and has encoded data previously stored therein indicative of the type of receiver media. A second transponder is integrally connected to the donor supply tray and also has encoded data previously stored therein indicative of the type of donor media. Each transponder is capable of receiving the first electromagnetic field to power the transponder and then generating the second electromagnetic field as the transponder is powered. The second electromagnetic field is characteristic of the data previously stored in the transponder and is indicative of type of media contained within the tray. Data stored in the receiver tray transponder attached to the receiver supply tray is necessarily different from data stored in the donor tray transponder. The printer then operates in accordance with the data sensed by the transceiver to produce quality prints consistent with the type of donor and receiver being used.

34 Claims, 3 Drawing Sheets

U.S. PATENT DOCUMENTS

| | | | | |
|---|---|---|---|---|
| 5,185,315 A | | 2/1993 | Sparer | |
| 5,196,862 A | | 3/1993 | Fisher, Sr. | |
| 5,224,784 A | | 7/1993 | Haftmann et al. | |
| 5,266,968 A | | 11/1993 | Stephenson | |
| 5,268,708 A | | 12/1993 | Harshbarger et al. | |
| 5,297,881 A | | 3/1994 | Ishiyama | |
| 5,305,020 A | | 4/1994 | Gibbons et al. | 347/177 |
| 5,318,370 A | | 6/1994 | Nehowig | |
| 5,331,338 A | | 7/1994 | Mager | |
| 5,342,671 A | | 8/1994 | Stephenson | |
| 5,426,011 A | | 6/1995 | Stephenson | |
| 5,430,441 A | | 7/1995 | Bickley et al. | |
| 5,455,617 A | | 10/1995 | Stephenson et al. | |
| 5,491,327 A | | 2/1996 | Saroya | |
| 5,491,468 A | | 2/1996 | Everett et al. | |
| 5,493,385 A | | 2/1996 | Ng | |
| 5,504,507 A | | 4/1996 | Watrobski et al. | |
| 5,513,920 A | | 5/1996 | Whritenor et al. | |
| 5,562,352 A | | 10/1996 | Whritenor et al. | |
| 5,565,906 A | | 10/1996 | Schoon | |
| 5,598,201 A | | 1/1997 | Stodder et al. | |
| 5,600,350 A | | 2/1997 | Cobbs et al. | |
| 5,600,352 A | | 2/1997 | Knierim et al. | |
| 5,610,635 A | | 3/1997 | Murray et al. | |
| 5,620,265 A | | 4/1997 | Kondo | |
| 5,647,679 A | | 7/1997 | Green et al. | |
| 5,661,515 A | | 8/1997 | Hevenor et al. | |
| 5,713,288 A | | 2/1998 | Frazzitta | |
| 5,755,519 A | | 5/1998 | Klinefelter | |
| 5,757,394 A | | 5/1998 | Gibson et al. | |
| 5,774,639 A | | 6/1998 | Schildkraut et al. | |
| 6,099,178 A | | 8/2000 | Spurr et al. | |
| 6,106,166 A | | 8/2000 | Spurr et al. | |
| 6,204,874 B1 | * | 3/2001 | Michelson | 347/176 |
| 6,227,643 B1 | * | 5/2001 | Purcell et al. | 347/19 |

OTHER PUBLICATIONS

Siwinski et al., application No. 09/334,375, Entitled: A Printer and Method Therefor Adapted to Sense Data Uniquely Associated with a Consumable Loaded Into the Printer, Dated: Jun. 16, 1999.

Spurr et al., application No. 09/586,612, Entitled: An Imaging Apparatus Capable of Forming an Image Consistent with Type of Imaging Consumable Loaded Therein and Method of Assembling the Apparatus, Dated: Jun. 2, 2000.

TEMIC Semiconductors TK5550, Read/Write Transponder, TELEFUNKEN Semiconductors, Rev. A1, Apr. 30, 1997.

TEMIC Semiconductors e5550, Standard Read/Write Identification IC, TELEFUNKEN Semiconductors, Rev. A3, Mar. 17, 1998.

* cited by examiner

PRINTER WITH DONOR AND RECEIVER MEDIA SUPPLY TRAYS EACH ADAPTED TO ALLOW A PRINTER TO SENSE TYPE OF MEDIA THEREIN, AND METHOD OF ASSEMBLING THE PRINTER AND TRAYS

CROSS REFERENCE TO RELATED APPLICATION

This is a continuation of application Ser. No. 09/218,595, filed Dec. 22, 1998, now ABN.

BACKGROUND OF THE INVENTION

This invention generally relates to printer apparatus and methods and more particularly relates to a printer with donor and receiver media supply trays each adapted to allow the printer to sense type of media therein, and method of assembling the printer and trays.

Pre-press color proofing is a procedure used by the printing industry for creating representative images of printed material. This procedure avoids the high cost and time required to produce printing plates and also avoids setting-up a high-speed, high-volume printing press to produce a representative sample of an intended image for proofing. Otherwise, in the absence of pre-press proofing, a production run may require several corrections and be reproduced several times to satisfy customer requirements. This results in lost profits. By utilizing pre-press color proofing, time and money are saved.

A laser thermal printer having half-tone color proofing capabilities is disclosed in commonly assigned U.S. Pat. No. 5,268,708 titled "Laser Thermal Printer With An Automatic Material Supply" issued Dec. 7, 1993 in the name of R. Jack Harshbarger, et al. The Harshbarger, et al. device is capable of forming an image on a sheet of thermal print media by transferring dye from a roll of dye donor material to the thermal print media. This is achieved by applying a sufficient amount of thermal energy to the dye donor material to form the image on the thermal print media. This apparatus generally comprises a material supply assembly, a lathe bed scanning subsystem (which includes a lathe bed scanning frame, a translation drive, a translation stage member, a laser printhead, and a rotatable vacuum imaging drum), and exit transports for exit of thermal print media and dye donor material from the printer.

The operation of the Harshbarger, et al. apparatus comprises metering a length of the thermal print media (in roll form) from the material supply assembly. The thermal print media is then measured and cut into sheet form of the required length, transported to the vacuum imaging drum, registered, and then wrapped around and secured onto the vacuum imaging drum. Next, a length of dye donor roll material is also metered out of the material supply assembly, measured and cut into sheet form of the required length. The cut sheet of dye donor roll material is then transported to and wrapped around the vacuum imaging drum, such that it is superposed in registration with the thermal print media, which at this point has already been secured to the vacuum imaging drum.

Harshbarger, et al. also disclose that after the dye donor material is secured to the periphery of the vacuum imaging drum, the scanning subsystem and laser write head provide the previously mentioned scanning function. This is accomplished by retaining the thermal print media and the dye donor material on the vacuum imaging drum while the drum is rotated past the print head that will expose the thermal print media. The translation drive then traverses the print head and translation stage member axially along the rotating vacuum imaging drum in coordinated motion with the rotating vacuum imaging drum. These movements combine to produce the image on the thermal print media.

According to the Harshbarger, et al. disclosure, after the intended image has been written on the thermal print media, the dye donor material is then removed from the vacuum imaging drum. This is done without disturbing the thermal print media that is beneath the dye donor material. The dye donor material is then transported out of the image processing apparatus by the dye donor exit transport. Additional dye donor materials are sequentially superposed with the thermal print media on the vacuum imaging drum, then imaged onto the thermal print media as previously mentioned, until the intended full-color image is completed. The completed image on the thermal print media is then unloaded from the vacuum imaging drum and transported to an external holding tray, which is associated with the image processing apparatus, by means of the print media exit transport. However, Harshbarger, et al. do not appear to disclose appropriate means for informing the printer of type of donor and receiver material loaded into the printer. It is desirable to inform the printer of type of donor and receiver material loaded into the printer in order to obtain high quality images.

Also, it is known in the printing arts that the previously mentioned dye donor roll is typically wound about a donor supply shaft to define a donor spool, which is loaded into the printer. Also, the previously mentioned receiver (in roll form) is typically wound about a receiver supply shaft to define a receiver spool, which is also loaded into the printer. However, it is desirable to match the specific type donor and receiver with a specific printer, so that high quality images are obtained. For example, it is desirable to inform the printer of the specific dye density comprising the donor, so that the laser write head applies an appropriate amount of heat to the donor in order to transfer a proper amount of dye to the receiver. This is desirable because different donor rolls can have different donor densities. Also, it is desirable to minimize the amount of hardware required to provide the cut sheets to the imaging drum. One means to accomplish this is to provide the donor and receiver to the printer in the form of pre-cut sheets packaged as cartridges.

In addition, it is also desirable to know number of frames (i.e., pages) remaining on a partially used donor or receiver cartridge. This is desirable because it is often necessary to exchange a partially used cartridge of donor or receiver for a full cartridge of donor or receiver. For example, this may be necessary to allow overnight printing when the printer must operate unattended. However, unattended operation of the printer requires precise media inventory control. That is, the printer should be preferably loaded with a full cartridge of donor material and receiver material in order that the printer does not stop printing due to lack of donor material and receiver material during an unattended extended time period (e.g., overnight printing). Therefore, a further problem in the art is insufficient donor and receiver material being present during unattended extended operation of the printer.

Currently, in order to properly calibrate the printer, an operator of the printer determines the characteristics of the donor (e.g., dye density, number of frames remaining on the donor, e.t.c.) and receiver (e.g., thickness, gloss, e.t.c.) and then manually programs the printer with this information to accommodate the specific dye donor and receiver being used. However, manually programming the printer is time consuming and costly. Moreover, the operator may make an error when manually programming the printer. Therefore, another problem in the art is time consuming and costly manual programming of the printer to accommodate the specific dye donor and receiver being used. Thus, an additional problem in the art is operator error associated with manual programming of the printer.

A donor supply spool obviating need to manually program a resistive head thermal printer with frame count information is disclosed in commonly assigned U.S. Pat. No. 5,455,617 titled "Thermal Printer Having Non-Volatile Memory" issued Oct. 3, 1995 in the name of Stanley W. Stephenson, et al. This patent discloses a web-type dye carrier for use in a thermal resistive head printer and a cartridge for the dye carrier. The dye carrier is driven along a path from a supply spool and onto a take-up spool. Mounted on the cartridge is a non-volatile memory programmed with information, including characteristics of the carrier. A two-point electrical communication format allows for communication to the memory in the device. In this regard, two electrically separated contacts disposed within the printer provide a communication link between the printer and cartridge when the cartridge is inserted into the thermal resistive head printer. Moreover, according to the Stephenson et al. patent, communication between the cartridge and printer can also be accomplished by use of opto-electrical or radio frequency communications. Although the Stephenson et al. patent indicates that communication between the cartridge and printer can be accomplished by use of opto-electrical or radio frequency communications, the Stephenson et al. patent does not appear to disclose specific structure to accomplish the opto-electrical or radio frequency communications. Moreover, although the Stephenson et al. patent discloses a donor supply having a memory programmed with information, the Stephenson et al. patent does not appear to disclose a receiver supply programmed with information.

Therefore, there has been a long-felt need to provide a printer with donor and receiver media supply trays each adapted to allow the printer to sense type of media therein, and method of assembling the printer and trays.

SUMMARY OF THE INVENTION

An object of the present invention is to provide a printer with donor and media supply trays each adapted to allow the printer to remotely sense data characteristic of the type of media therein, and method of assembling the printer and trays.

With the above object in view, the present invention resides in a printer adapted to sense data characteristic of the type of media disposed therein, comprising a transceiver for transmitting a first electromagnetic field and for sensing a second electromagnetic field; a media supply tray spaced-apart from said transceiver for supplying the media therefrom; and a transponder having a memory with the transponder connected to said media tray, said memory having data stored therein indicative of the type of media, said transponder capable of receiving the first electromagnetic field and generating a second electromagnetic field in response to the first electromagnetic field received thereby, the second electromagnetic field being sensed by said transceiver and characteristic of the data stored in said memory.

With the above object in view, the invention also resides in a media supply tray adapted to allow a printer to sense data characteristic of the type of a media in the media supply tray, comprising a tray body for supplying the media therefrom; a transceiver spaced-apart from said tray body for transmitting a first electromagnetic field and for sensing a second electromagnetic field; and a transponder having a memory coupled to said tray body and having memory with data stored therein indicative of the type of media, said transponder capable of receiving the first electromagnetic field and generating the second electromagnetic field in response to the first electromagnetic field received thereby, the second electromagnetic field being sensed by said transceiver and characteristic of the data stored in said memory.

According to an embodiment of the present invention, a receiver supply tray, which is adapted to allow the printer to sense the type of receiver therein has a supply of the receiver in cut sheet form. Also provided is a donor supply tray, which is adapted to allow the printer to sense the type of donor therein. The donor supply tray has a supply of donor in cut sheet form. A radio frequency transceiver unit is disposed proximate the first and second trays. The radio frequency transceiver unit is capable of transmitting a first electromagnetic field of a predetermined first radio frequency. The transceiver is also capable of sensing a second electromagnetic field of a predetermined second radio frequency. An EEPROM (i.e., Electrically Erasable Programmable Read Only Memory) semi-conductor chip is contained in a first transponder that is integrally connected to the first tray and has encoded data stored therein indicative of type of receiver contained within the first tray. In addition, another EEPROM semi-conductor chip is contained in a second transponder that is integrally connected to the second tray and has encoded data stored therein indicative of the type of donor contained within the second tray. Both chips are capable of receiving the first electromagnetic field to power the chips. When each chip is powered, each chip generates its respective second electromagnetic field. The second electromagnetic field generated by each chip is characteristic of the encoded data previously stored in that chip. In this manner, the radio frequency transceiver unit senses the second electromagnetic field as each chip generates its respective second electromagnetic field. The second electromagnetic field generated by the first transponder has the receiver media data subsumed therein. The second electromagnetic field generated by the second transponder has the donor media data subsumed therein. The printer then operates in accordance with the media data sensed by the radio frequency transceiver to produce the intended image consistent with the specific type of donor and receiver being used.

A feature of the present invention is the provision of a radio frequency transceiver capable of transmitting a first electromagnetic field to be intercepted by a first transponder having data stored therein indicative of the receiver media and by a second transponder having data stored therein indicative of the donor media, each transponder capable of generating a second electromagnetic field to be sensed by the radio frequency transceiver, the first transponder being integrally connected to a receiver tray and the second transponder being integrally connected to a donor tray.

An advantage of the present invention is that use thereof eliminates need for manual data entry when loading a donor tray or a receiver tray into the printer.

Another advantage of the present invention is that use thereof automatically calculates number of pages (i.e., frames) remaining on partially used donor and receiver supply trays.

Still another advantage of the present invention is that multiple colors of donor cut sheets may be loaded into a single tray in an alternating fashion so as to minimize mechanical complexity. Appropriate data indicative of all colors present in the tray may be encoded and stored in the tray.

Yet another advantage of the present invention is that use thereof allows for optimized image reproduction by allowing automatic calibration of the printer according to the specific type of donor and receiver loaded therein so as to reduce need for a plurality of calibration proofs.

A further advantage of the present invention is that use of the invention avoids wear of the donor and receiver supply trays during calibration of the printer.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

DETAILED DESCRIPTION OF THE INVENTION

The present description will be directed in particular to elements forming part of, or cooperating more directly with, apparatus in accordance with the invention. It is to be understood that elements not specifically shown or described may take various forms well known to those skilled in the art.

Figure 1:
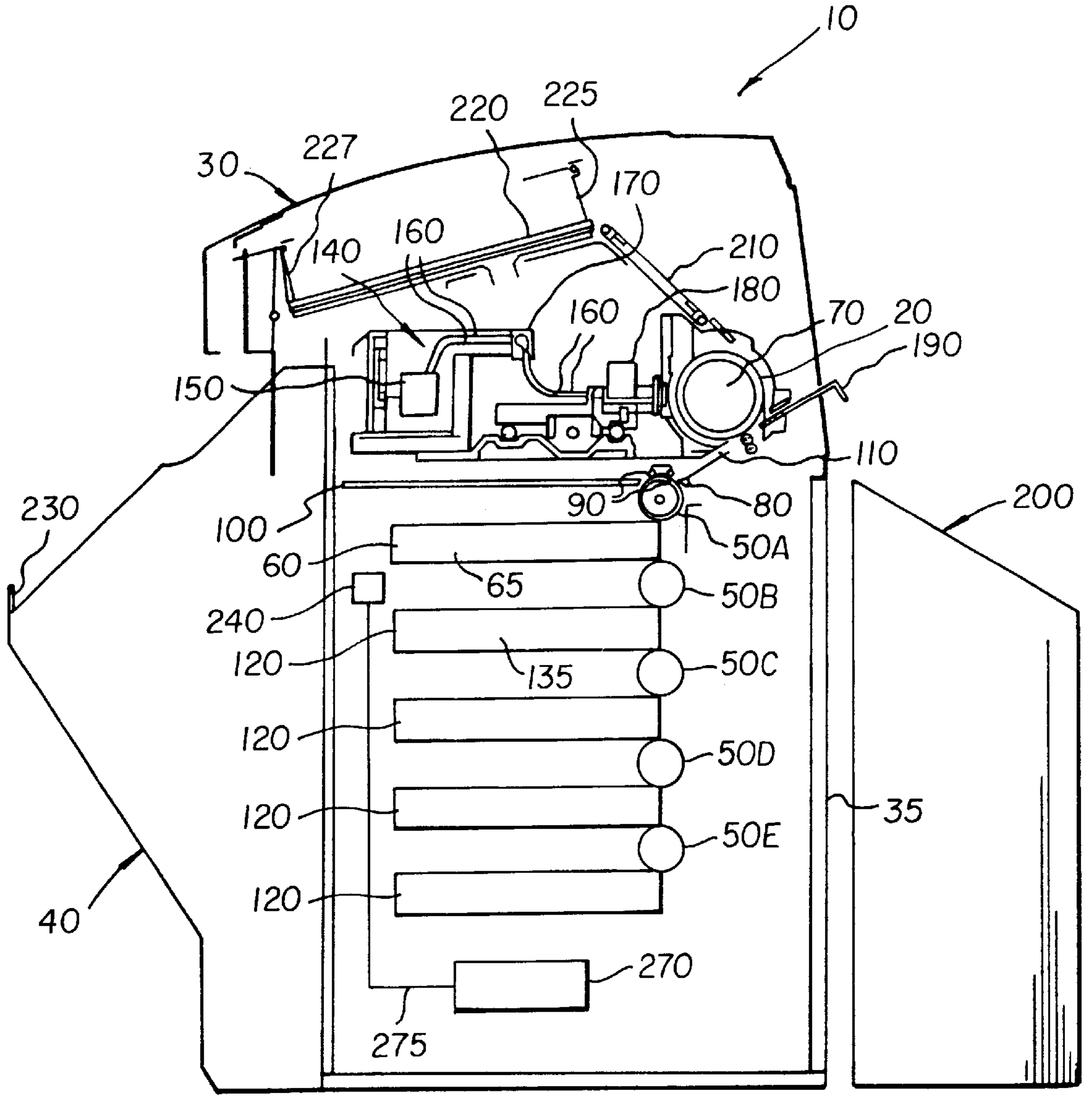
FIG. 1 is a view in vertical section of a printer belonging to the invention, this view showing a plurality of donor supply trays having cut sheets of donor media of predetermined colors and also showing a receiver supply tray having receiver cut sheets of receiver.
Figure 2:
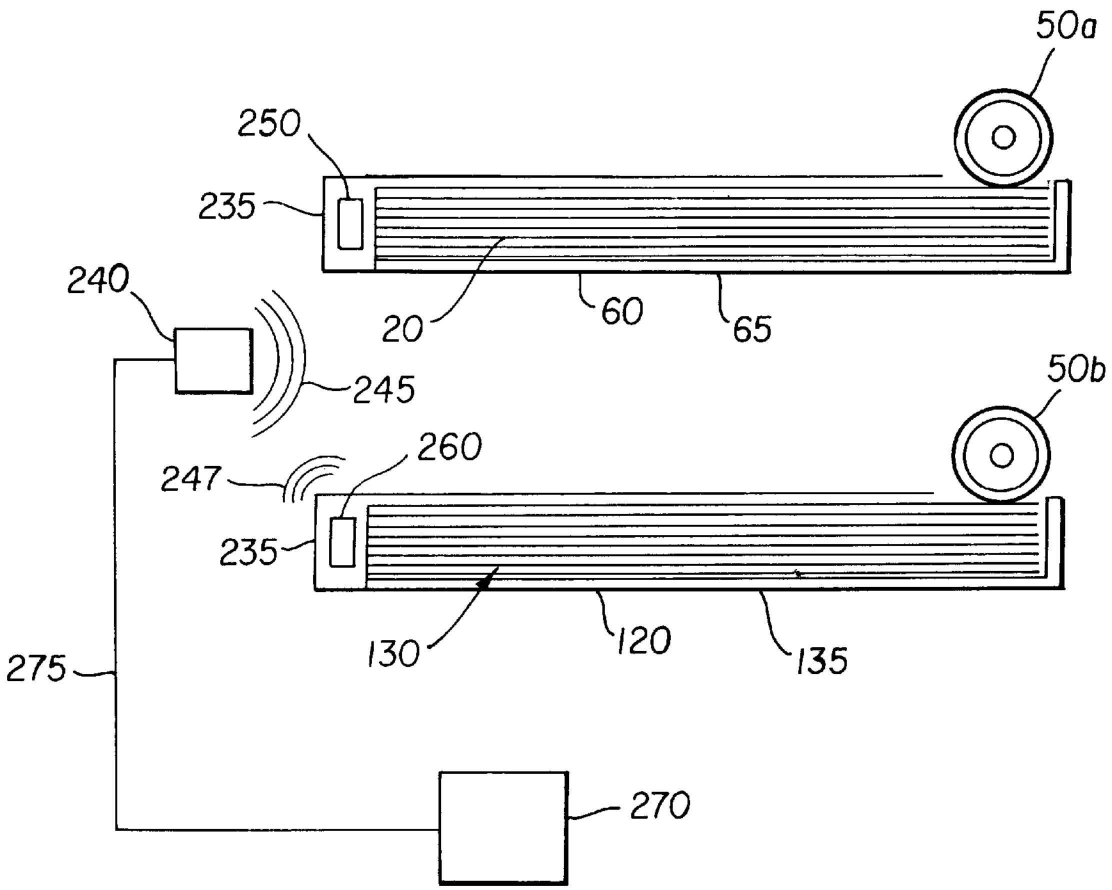
FIG. 2 is an enlarged view in elevation of one of the donor supply tray and the receiver supply tray, this view showing a transceiver, a first transponder connected to the donor supply tray and a second transponder connected to the receiver supply tray.

Therefore, referring to FIGS. 1 and 2, there is shown a laser thermal printer, generally referred to as 10, for forming an image (not shown) on cut sheets of a receiver media 20 which may be paper or transparency. Printer 10 includes a housing 30 for housing components belonging to printer 10. More specifically, a movable, hinged door 40 is attached to a front portion of housing 30 for permitting access to the interior of housing 30. Also provided is a rotatable receiver media roller 50*a* and a plurality of rotatable donor media rollers 50*b*–50*e*, for reasons disclosed hereinbelow.

Referring again to FIGS. 1 and 2, a receiver media supply tray 60 having receiver media 20 therein in cut sheet form 20 is housed within a media supply 35. Media supply 35 is bordered by the lower portion of housing 30. Receiver media supply tray 60 is defined by a tray body 65, which may be generally rectangular in shape. As disclosed in more detail hereinbelow, the invention is capable of characterizing receiver 20 (e.g., surface gloss, or whether the print media is paper, film, metallic plates, or other material capable of accepting an image). Receiver media 20 is ultimately passed to a vacuum imaging drum 70 for forming receiver medium to which colorants are passed. A plurality of receiver supply trays 60 of different types of receiver media may be present, only one being shown for clarity. Thus, it may be appreciated that the invention is not limited to use of one receiver supply tray 60, because more receiver media supply trays 60 may be used depending on the type of receiver desired and the number of tray supply positions present.

Referring yet again to FIGS. 1 and 2, a media guide 80 directs the cut sheets of receiver media 20 under a pair of media guide rollers 90. In this regard, media guide rollers 90 engage a sheet of receiver media 20 for assisting receiver media roller 50*a*, so as to direct receiver media 20 onto a media staging tray 100. An end of media guide 80 is rotated downwardly, as illustrated in the position shown, and the direction of rotation of media roller 50*a* is reversed. Reversing direction of rotation of receiver media roller 50*a* moves receiver media 20, which is resting on media staging tray 100, to a position under the pair of media guide rollers 90, upwardly through an entrance passageway 110 and around rotatable vacuum imaging drum 70. At this point, the sheet of receiver media 20 rests on drum 70.

Referring to FIG. 2, a donor supply tray 120 having cut sheets of donor media 130 therein is also housed within the lower portion of housing 30. Donor supply tray 120 is defined by a tray body 135, which may be generally rectangular in shape. Any desired number of donor media trays 120 may be used depending on number of colors need to produce the full-color image, but only four trays are shown for clarity. Thus, there may be four donor media supply trays 120 respectively assigned to the colors cyan, magenta, yellow and black (CMYB) for producing fall-color prints. Donor media material 130 is ultimately passed to vacuum imaging drum 70 where dye imbedded in donor medium 120 is passed to receiver media 20. Also, it may be understood that the terminology "dye" is intended herein to include any type of colorant, such as inks or pigments.

Returning to FIG. 1, the process of passing dyes (e.g., colorants) to receiver media 20 will now be described. In this regard receiver media roller 50*a* and donor media rollers 50*b* through 50*e* along with media guide 80 pass receiver sheet 20 or dye donor sheet 130, as the case may be, onto media staging tray 100 and ultimately onto vacuum imaging drum 70. Of course, donor sheet 130 is passed onto drum 70 in registration with receiver sheet 20, which was passed onto drum 70 before donor sheet 130 is passed onto drum 70. At this point, dye donor sheet 130 now rests atop receiver sheet 20. Again this is so because receiver sheet 20 was passed onto drum 70 before dye donor sheet 130 was passed onto drum 70. Thus, the process of passing dye donor sheet 130 onto vacuum imaging drum 70 is substantially the same process as passing receiver sheet 20 onto vacuum imaging drum 70.

Referring yet again to FIG. 1, a laser assembly, generally referred to as 140, includes a plurality of laser diodes 150. Laser diodes 150 are connected by means of fiber optic cables 160 to a distribution block 170 and ultimately to a printhead 140. Printhead 140 directs thermal energy received from laser diodes 150 and causes donor sheet 130 to pass the desired color to receiver sheet 20. Moreover, printhead 140 is movable with respect to vacuum imaging drum 70, and is arranged to direct a beam of laser light to dye donor sheet 130. For each laser diode 150, the beam of light from printhead 140 is individually modulated by modulated electronic signals, which signals are representative of the shape and color of an original image to be reproduced on receiver sheet 20. In this manner, donor sheet 130 is heated to cause volatilization only in those areas of receiver sheet 20 necessary to reconstruct the shape and color of the original image. In addition, it may be appreciated that printhead 140 is attached to a lead screw (not shown) by means of a lead screw drive nut (not shown) and drive coupling (also not shown) for permitting movement axially along a longitudinal axis of vacuum imaging drum 70 in order to transfer data that creates the desired image on receiver sheet 20.

Again referring to FIG. 1, drum 70 rotates at a constant velocity. Travel of printhead 220 begins at one end of receiver sheet 20 and traverses the entire length of receiver sheet 20, thereby tracing a helical pattern on receiver sheet 20, for completing the colorant transfer process for donor sheet 130 resting on receiver sheet 20. After printhead 140 completes the transfer process for the donor sheet 130 resting on receiver sheet 20, donor sheet 130 is then removed from vacuum imaging drum 70 and transferred out of housing 30 by means of an ejection chute 190. Donor sheet 130 eventually comes to rest in a waste bin 200 for removal by an operator of printer 10. The above described process is then repeated for each donor media supply tray 120 having donor media 130 therein.

Still referring to FIG. 1, after colorants from donor media supply trays 120 have been transferred and donor sheets 130 have been removed from vacuum imaging drum 70, receiver sheet 20 is removed from vacuum imaging drum 70 and transported by means of a transport mechanism 210 to a color binding assembly 220. An entrance door 225 of color binding assembly 220 opens for permitting receiver sheet 20 to enter color binding assembly 260, and closes once receiver sheet 20 comes to rest in color binding assembly 260. Color binding assembly 220 processes receiver sheet 20 for further binding colors transferred to receiver sheet 20. After the color binding process has been completed, a media exit door 227 is opened and receiver sheet 20 with the intended image thereon passes out of color binding assembly 220 and housing 30 and thereafter comes to rest against a media stop 230. Such a printer 10 is disclosed in more detail in commonly-assigned U.S. patent application Ser. No. 08/883,058 titled "A Method Of Precision Finishing A Vacuum Imaging Drum" filed Jun. 26, 1997 in the name of Roger Kerr, the disclosure of which hereby incorporated by reference.

As best seen in FIG. 2, the previously mentioned receiver media supply tray 60 has the receiver media 20 contained within. Receiver media 20 is preferably of a specific type uniquely matched to type of printer 10, for reasons disclosed hereinbelow. Also, the previously mentioned donor supply tray 120 has the donor media material 130 contained within. Donor material 130 is also preferably of a specific type uniquely matched to type of printer 10, for reasons disclosed hereinbelow.

Referring again to FIG. 2, receiver supply tray 60 may or may not be refillable by a receiver media manufacturer and donor supply tray 120 may or may not be refillable by a donor media manufacturer. That is, trays 60/120 may themselves be disposable when empty. It may be appreciated that various light-weight, inexpensive, materials may be used for trays 60 and 120, such as cardboard or plastic, for reducing weight of trays 60 and 120. Use of such inexpensive materials allows trays 60 and 120 to be disposable if desired. Additionally, trays 60 and 120 may also be fabricated from metals and plastics for the purpose of providing rigidity, durability and to facilitate reuse and recycling. In any event, each of the trays 60 and 120 are preferably rectangular in shape and contain a section which captures said receiver cut sheets 20 or donor cut sheets 130, respectively. The tolerances of said trays 60 and 120 are such that the mechanical position of receiver cut sheets 20 and donor cut sheets 130 are held to allow proper feeding of sheets one at a time by receiver media roller 50*a* and donor media rollers 50*b* through 50*e*. A sidewall portion 235 (e.g., plastic) of each of trays 60 and 120 surrounds transponder for reasons described hereinbelow. Sidewall portion 235 is preferably not metal so as not to interfere with radio frequency (RF) communications between a radio frequency transceiver 240 and the transponder. In this regard, sidewall portion 235 may be formed of a polymer or other non-metallic material. For reasons provided hereinbelow, radio frequency transceiver 240 includes RF control circuitry (not shown) and a suitable RF antenna (also not shown) is disposed in housing 30 proximate trays 60 and 120 but spaced-apart therefrom. In this regard, transceiver 240 may preferably be located from between approximately 2 centimeters to approximately a meter or more away from trays 60 and 120.

Still referring to FIG. 2, transceiver 240 is capable of transmitting a first electromagnetic field 245 of a first predetermined frequency, for reasons disclosed presently. Transceiver 240 is also capable of sensing a second electromagnetic field 247 of a second predetermined frequency, for reasons disclosed presently. In this regard, transceiver 240 may transmit a first electromagnetic field 245 having a preferred first predetermined frequency of approximately 132 kHz. Such a transceiver 240, may be a Model S2000 transceiver available from Texas Instruments, Incorporated, located in Dallas Tex., USA. Alternatively, transceiver 240 may also be a Model "U2270B" transceiver available from Vishay-Telefunken Semiconductors, Incorporated, located in Malvern, Pa., U.S.A.

Referring yet again to FIG. 2, a first transponder 250 is integrally connected to receiver supply tray 60, such as being embedded in sidewall portion 235 to protect first transponder 250 from damage. Thus, first transponder 250 is embedded in receiver supply tray 60, so that none of first transponder 250 is visible to the naked eye. Embedding first transponder 250 in sidewall portion 235 also enhances aesthetic appearance of tray 60. In addition, a second transponder 260 is integrally connected to donor supply tray 120, such as being embedded in sidewall portion 235 of donor supply tray 120. Thus, second transponder 260 is embedded in donor supply tray 120, so that none of second transponder 260 is visible to the naked eye in order to enhance aesthetic appearance of donor supply tray 120 and to protect second transponder 260 from damage. It may be understood that each of first transponder 250 and second transponder 260 is capable of transmitting its own individual second electromagnetic field that is uniquely identified with it. That is, the second electromagnetic fields for first and second transponders 250/260 may in fact have different frequencies. First and second transponders 250/260 each includes a non-volatile electrically erasable programmable read-only memory (EEPROM) semi-conductor chip. First and second transponders 250/260 each has encoded data stored in its respective EEPROM. The encoded data stored in each transponder 250/260 is indicative of media materials 20/130, respectively. This data, which first and second transponders 250/260 will electromagnetically broadcast to transceiver 240, is preferably stored in transponders 250/260 in binary bits. For this purpose, in the preferred embodiment, each of transponders 250 and 260 may be a "SAMPT" (Selective Addressable Multi-Page Transponder) part number RI-TRP-IR2B available from Texas Instruments, Incorporated, located in Dallas, Tex., USA. Alternatively, first and second transponders 250/260 each may be a Model "TL5550" transponder available from Vishay-Telefunken Semiconductors, Incorporated, located in Malvern, Pa., USA. Use of non selective address transponders requires transceiver 240 to be articulated by a suitable mechanism (not shown) so as to select which transponder 250/260 is to be in electromagnetic communication with transceiver 240. By way of example only, and not by way of limitation, the data stored in first transponder 250 may be any of the exemplary data displayed in TABLE I hereinbelow.

TABLE I

Data Stored in First Transponder 250

| Data Stored | Number of Bits | Description |
|---|---|---|
| Media Type Identifier | 8 | An 8 bit number encoding type of receiver in the media supply tray. 255 different media types possible. |
| Product Code | 40 | 10 digit product code. Not required if Media Type Identifier is used. |
| Catalog Number | 32 | For example, R704085. Not required if Media Type Identifier is used. |
| Manufacture Date | 16 | 16 bit encoded date. Includes a 4 bit month, 5 bit day, and a 7 bit year. |
| Density Modifier | 8 | An 8 bit scaled value, which is used to represent minimum density added by an "intermediate". |
| Intermediate Frame Counter | 8 | 8 bit counter recording how many pages are left on the media roll |
| Mean Media Thickness | 4 | 4 bit mean thickness measure. Mean Media Thickness used to adjust focus for within media tray medial thickness deviations from typical. |
| Focus Position Modifier | 8 | 8 bit value specifying a focus position adjustment. |
| Sensitometric Data | 24 | For providing exposure density information. |

By way of example only, and not by way of limitation, the data stored in second transponder 260 may be any of the exemplary data displayed in TABLE II hereinbelow.

TABLE II

Data Stored In Second Transponder 260

| Data Stored | Number of Bits | Description |
|---|---|---|
| Media Type Identifier | 8 | An 8 bit number encoding type of donor in the media supply tray. 255 different media types possible. |
| Product Code | 40 | 10 digit product code. Not required if Media Type Identifier is used. |
| Catalog Number | 32 | For example, R70 4085. Not required if Media Type Identifier is used. |

TABLE II-continued

Data Stored In Second Transponder 260

| Data Stored | Number of Bits | Description |
|---|---|---|
| Bar Code | 56 | Bar-code for boxed product. May be less than 56 bits. For example, G491R0732894. |
| Tray Identifier | 24 | A 24 bit number used to determine when the dye donor media tray was manufactured. This Tray Identifier could be looked-up by the operator to determine manufacturing date. The Tray Identifier is a 24 bit number ranging from 0 to 16.7 thousand |
| Manufacture Date | 16 | 16 bit encoded date. Includes a 4 bit month, 5 bit day, and a 7 bit year. |
| Mean Donor Dye Density | 8 | 8 bit scaled value. Each media tray necessarily has a different fixed Mean Donor Dye Density value. |
| Donor Frame Counter | 8 | 8 bit counter recording how many pages are left on the donor roll. |
| Mean Donor Media Thickness | 4 | 4 bit mean thickness measure. Mean Donor Media Thickness used to adjust focus for within media tray media thickness deviations from typical. |

Moreover, a computer or microprocessor 270 is electrically coupled to transceiver 240, such as by means of conducting wire 275, for controlling printer 10. Microprocessor 270 processes data received by transceiver 240 from trays 60/120. In this regard, microprocessor 270 is capable of controlling various printer functions including, but not limited to, laser printhead power, exposure level to which donor material 130 is subjected, media inventory control, and correct loading of media trays 60/120 into printer 10. In addition, it should be appreciated that there may be a plurality of first transponders 250 on receiver supply tray 60 for allowing transceiver 240 to poll and select a particular transponder 250 depending on receiver data to be obtained. Similarly, it should also be appreciated that there may be a plurality of second transponders 260 on tray 120 for allowing transceiver 240 to poll and select a particular second transponder 260 depending on donor data to be obtained.

Referring again to FIG. 2, microprocessor 270 utilizes the data broadcast by transponders 250/260 to transceiver 240, either for customizing printer calibration for a specific donor and receiver or for simply reading calibration data already stored in transponders 250/260. In this manner, for example, microprocessor 270 can automatically determine lot number, roll number and manufacturing date of media trays 60/120. Also, microprocessor 270 can determine amount of receiver and donor materials 20/130 present in media supply trays 60/120 at any time allowing a partially used receiver or donor supply tray 60 or 120 to be removed and subsequently reloaded into the same or a different printer 10. This information would otherwise need to be manually entered into printer 10, thereby increasing printing costs and risk of operator error. However, it may be appreciated from the disclosure herein that data usage is transparent to the operator of printer 10 because such data usage is automatically performed in "the background". Performing data usage in "the background" improves operator productivity because the operator need not take the time to manually enter data into printer 10 with the attendant possibility of operator error. Moreover, the communications data link between transceiver 240 and microprocessor 270 may be by means of a well-known "RS232" port link or any other type of serial or parallel communication link.

As previously mentioned, microprocessor 270 can determine if media supply trays 60/120 are properly loaded into printer 10 by simply determining the data contained within first transponder 250 or second transponder 260. In this way, the printer can determine if the correct media is properly loaded into the correct position with the printer 10. An improperly loaded receiver media supply tray 60 or donor media supply tray 120 can damage the optical system of printer 10.

Figures 3, 3A:
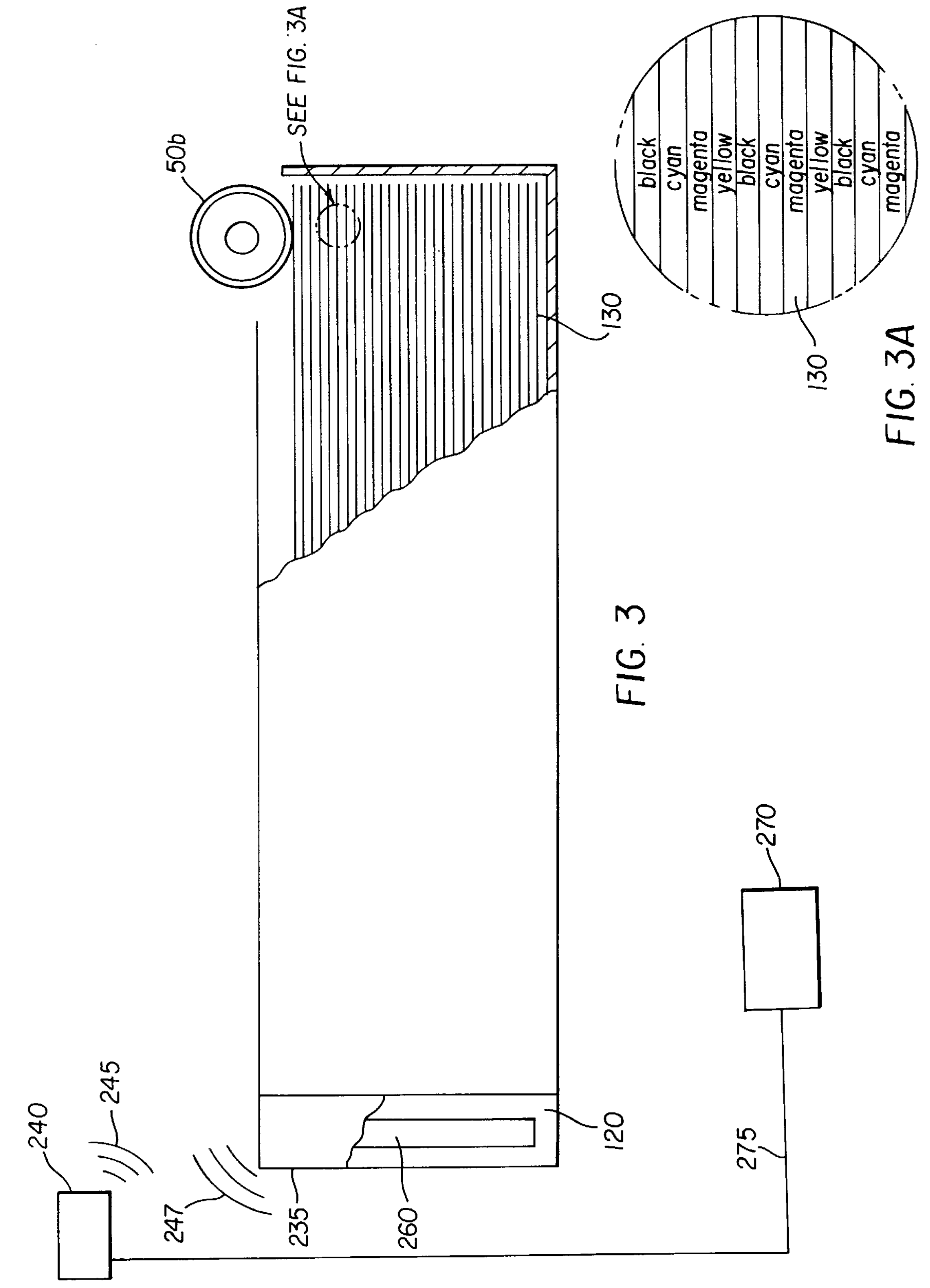
FIG. 3 is a view in partial elevation of an alternate embodiment of the donor supply tray, the donor supply tray having a plurality of different colored donor cut sheets sequentially loaded in the order of intended use to provide a full-color printed image.
FIG. 3A is an enlarged view in partial elevation of a portion of the alternative embodiment donor supply tray, this view showing the different colored donor cut sheets sequentially loaded in the order of intended use.

As best seen in FIGS. 3 and 3A, there is shown an alternative embodiment of donor supply tray 120. In this alternative embodiment, each dye donor supply tray 120 has a plurality of differently colored donor cut sheets (e.g., yellow, magenta, cyan and/or black). That is, rather than each donor supply tray 120 being dedicated to an individual color, each of a reduced number of donor supply trays 120 may instead have a plurality of colors loaded in a predetermined sequence corresponding to the order of use during printing of the full-color image. This, alternative embodiment of donor supply tray 120 provides increased operational versatility for printing a multiplicity of colors as well as a space savings and a reduction in the amount of electromechanical complexity.

It may be appreciated from the teachings hereinabove that an advantage of the present invention is that use thereof eliminates need for manual data entry when loading a receiver or donor media supply tray into the printer. This is so because data stored in the transponders that are connected to the media supply trays is characteristic of the media contained within the supply trays. This data is electromagnetically broadcast by these transponders and automatically read by the transceiver.

It may be appreciated from the teachings hereinabove that another advantage of the present invention is that use thereof automatically determines number of pages (i.e., frames) remaining in the receiver and donor media supply trays. This is so because the frame counter that is included as data in each transponder provides an 8 bit counter that records how many pages are left in the receiver or donor media supply tray. This counter is decremented each time a frame is used. Automatic determination of number of pages remaining in a partially used receiver or donor media supply tray is important because it is often necessary to exchange a partially used tray of receiver or donor media for a full tray of receiver or donor media for overnight printing when the printer operates unattended.

It may be appreciated from the teachings hereinabove that yet another advantage of the present invention is that use thereof allows for optimum high quality image reproduction by allowing automatic calibration of the printer according to the specific type of receiver and donor media loaded therein. This reduces need for a plurality of pre-press calibration proofs. This is so because the transponders belonging to the receiver and donor media supply trays inform the printer, by means of the second electromagnetic field, of the type of receiver or donor media loaded into the printer, so that the printer self-adjusts to provide optimal printing based on specific type of receiver and donor media loaded into the printer.

It may be appreciated from the teachings hereinabove that a further advantage of the present invention is that use of the thereof avoids wear of the donor and receiver supply trays during calibration of the printer. This so because the printer includes a non-contacting radio frequency transceiver to detect type of donor and receiver supply trays; that is, the radio frequency transceiver is positioned remotely from the donor and receiver supply tray and does not contact the donor tray and receiver supply tray.

While the invention has been described with particular reference to its preferred embodiments, it will be understood by those skilled in the art that various changes may be made and equivalents may be substituted for elements of the preferred embodiments without departing from the invention. For example, the invention is usable whenever it is desirable to characterize a tray of material in order to calibrate an apparatus intended to accommodate the tray of material. As a further example, the invention is applicable to any image processor, such as an ink-jet printer. Also, as yet another example, the donor may have dye, pigments, or other material which is transferred to the receiver media.

Therefore, what is provided is a printer with donor and receiver media supply trays each adapted to allow a printer to sense type of media therein, and method of assembling the printer and trays.

PARTS LIST

Parts list
10 . . . printer
20 . . . receiver media
30 . . . housing
35 35 lower portion/media supply
40 . . . door
50*a* . . . receiver media roller
50*b*/*c*/*d*/*e* . . . donor media rollers
60 . . . receiver media supply tray
65 . . . receiver media supply tray body
75 . . . imaging drum
80 . . . media guide
90 . . . media guide rollers
100 . . . media staging tray
110 . . . passageway
120 . . . dye donor media supply tray
130 . . . donor media
135 . . . dye donor media supply tray body
130 . . . laser assembly
150 . . . laser diodes
160 . . . fiber optic cables
170 . . . distribution block
140 . . . printhead
190 . . . chute
200 . . . waste bin
210 . . . transport mechanism
220 . . . binding assembly
225 . . . media entrance door
227 . . . media exit door
230 . . . media stop
235 . . . sidewall portion
240 . . . transceiver
245 . . . first electromagnetic field
247 . . . second electromagnetic field
250 . . . first transponder
260 . . . second transponder
270 . . . microprocessor
275 . . . conducting wire

What is claimed is:

1. A printer media supply adapted to sense data characteristic of the type of media disposed therein, comprising:

(a) a transceiver for transmitting a first electromagnetic field and for sensing a second electromagnetic field;

(b) more than one media supply tray each media supply tray being disposed in the media supply at locations spaced-apart from said transceiver for supplying media therefrom; and (c) a transponder connected to each media supply tray, each transponder having a memory with data stored therein indicative of the type of media, in the respective media supply tray to which the transponder is connected, each transponder capable of receiving the first electromagnetic field to power each transponder and with said transponder generating a second electromagnetic field in response to the first electromagnetic field received thereby, each second electromagnetic field generated by each transponder being sensed by said transceiver and characteristic of the data stored in said memory, wherein said transceiver selectively polls each transponder to obtain data from each transponder and associates each transponder with one of the locations to determine the type of media disposed in the media supply tray at each location.

2. A printer media supply adapted to sense data characteristic of the type of media disposed therein, comprising:

(a) a transceiver for transmitting a first electromagnetic field and for sensing a second electromagnetic field;

(b) a first media supply tray disposed at a first location spaced-apart from said transceiver for supplying a first media therefrom;

(c) a second media supply tray disposed at a second location spaced-apart from said transceiver for supplying a second media therefrom;

(d) a first transponder connected to said first tray, said first transponder having a first memory with data stored therein indicative of type of first media, said first transponder capable of receiving the first electromagnetic field to power said first transponder and with said first transponder generating the second electromagnetic field in response to the first electromagnetic field received thereby, the second electromagnetic field generated by the first transponder being sensed by said transceiver and characteristic of the data stored in said first memory; and (e) a second transponder connected to said second tray, said second transponder having a second memory with data stored therein indicative of type of the second media, said second transponder capable of receiving the first electromagnetic field to power said second transponder and with said second transponder generating another second electromagnetic field in response to the first electromagnetic field received thereby, the second electromagnetic field generated by the second transponder being sensed by said transceiver and characteristic of the data stored in said second memory, wherein said transceiver selectively polls each transponder to obtain data from each transponder and associates each transponder with one of the locations to determine the type of media disposed in the media supply tray at the first and second locations.

3. The printer media supply of claim 2, wherein each of said first memory and said second memory is a read/write memory.

4. The printer media supply of claim 2, wherein the media supply comprises a mechanism for moving the transceiver for communication with the transponders at the first location and for moving the transceiver communication with the transponder at the second location.

5. The printer media supply of claim 4, wherein the transceiver determines the type of media in the first media supply tray based upon data received by the transceiver when moved to communicate with the transponder in the first location with the media supply tray located at the first physical location and wherein the transceiver further determines the type of media in the second media supply based upon data received by the transceiver when the transceiver is moved for communication with the transponder in the second location.

6. A printer adapted to sense data characteristic of the type of media disposed therein, comprising:

(a) a printhead;

(b) a transceiver disposed in association with said printhead for transmitting a first electromagnetic field and for sensing a second electromagnetic field;

(c) a first media supply tray disposed at a first location spaced-apart from said transceiver, said first tray having a supply of a first media therein in the form of cut sheets;

(d) a second media supply tray disposed at a second location spaced-apart from said transceiver, said second tray having a supply of a second media in the form of cut sheets;

(e) a first transponder integrally connected to said first tray, said first transponder having data stored therein indicative of type of the first media said first transponder capable of receiving the first electromagnetic field to power said first transponder and with said first transponder generating the second electromagnetic field in response to the first electromagnetic field received thereby, the second electromagnetic field generated by the first transponder being sensed by said transceiver and characteristic of the data stored in said first transponder; and (f) a second transponder integrally connected to said second tray, said second transponder having data stored therein indicative of type of second media, said second transponder capable of receiving the first electromagnetic field to power said second transponder and with said second transponder generating another second electromagnetic field in response to the first electromagnetic field received thereby, the second electromagnetic field generated by the second transponder being sensed by said transceiver and characteristic of the data stored in said second transponder, wherein said transceiver selectively polls each transponder to obtain data from each transponder and associates each transponder with one of the first and second locations the media supply trays to determine the type of media disposed in the media supply trays at the first location and at the second location.

7. The printer of claim 6, wherein said first transponder and said second transponder each have a read/write memory semiconductor chip.

8. The printer of claim 6, wherein said transceiver transmits the first electromagnetic field at a predetermined first radio frequency.

9. The printer of claim 8, wherein each of said first transponder and said second transponder transmits the second electromagnetic field at a predetermined second radio frequency.

10. The printer of claim 6, wherein said printhead is a laser printhead for thermally activating the second media by modulating a laser beam said modulation based at least in part on the type of second media being activated.

11. A printer adapted to sense data characteristic of the type of media disposed therein, and further adapted to print using a donor media capable of being thermally activated to transfer dye therefrom, the printer comprising:

(a) a laser printhead;

(b) a transceiver disposed in association with said printhead for transmitting a first electromagnetic field of a predetermined first radio frequency and for sensing a second electromagnetic field of a predetermined second radio frequency;

(c) a receiver supply tray disposed at a first location spaced-apart from said transceiver, said receiver supply tray having a supply of a receiver in the form of cut sheets to be supplied therefrom;

(d) a donor supply tray disposed at a second location spaced-apart from said transceiver, said donor supply tray having a supply of a donor in the form of cut sheets to be supplied therefrom, the donor capable of being thermally activated by said laser printhead;

(e) a first transponder integrally connected to said receiver supply tray and having a first read/write memory semiconductor chip with encoded data stored therein indicative of the type of receiver, said first transponder capable of receiving the first electromagnetic field to selectively power said first chip and capable of generating the second electromagnetic field as said first chip is selectively powered, the second electromagnetic field generated by the first transponder being characteristic of the data stored in said first chip so that the data is subsumed in the second electromagnetic field; and (f) a second transponder integrally connected to said donor supply tray and having a second read/write memory semiconductor chip with encoded data stored therein indicative of the type of donor material said second transponder capable of receiving the first electromagnetic field to selectively power said second chip and capable of generating another second electromagnetic field as said second chip is selectively powered, the second electromagnetic field generated by the second transponder being characteristic of the data stored in said second chip so that the data is subsumed in the second electromagnetic field generated by the second transponder, whereby said transceiver senses the second electromagnetic fields as said first transponder and said second transponder generate their respective second electromagnetic fields; and (g) a microprocessor interconnecting said printhead and said transceiver for controlling said printhead in accordance with the data subsumed in the second electromagnetic fields received by said transceiver, wherein said transceiver selectively polls each transponder to obtain data from each transponder and associates the data obtained from each transponder with one of the first and second locations to determine the type of media disposed in the media supply trays at the first location and at the second location.

12. A method of assembling a printer media supply adapted to sense data characteristic of the type of media disposed therein, the method comprising the steps of:

(a) providing a transceiver for transmitting a first electromagnetic field and for sensing a second electromagnetic field;

(b) disposing more than one media supply tray at locations spaced-apart from the transceiver for supplying the media therefrom; and (c) connecting a transponder to each one of the more than one media supply tray, the transponder having a memory with data stored therein indicative of the type of media, each transponder capable of receiving the first electromagnetic field to power said transponder and with said transponder generating the second electromagnetic field in response to the first electromagnetic field received thereby, the second electromagnetic field generated by each transponder being sensed by the transceiver and characteristic of the data stored in the memory wherein the provided transceiver is adapted to selectively poll each transponder to obtain data from each transponder and associates each transponder with one of the locations to determine the type of media disposed in the media supply tray at each location.

13. A method of assembling a printer media supply adapted to sense data characteristic of the type of media disposed therein, comprising the steps of:

(a) providing a transceiver for transmitting a first electromagnetic field and for sensing a second electromagnetic field;

(b) disposing a first media supply tray disposed at a first location spaced-apart from the transceiver for supplying a first media therefrom;

(c) disposing a second media supply tray disposed at a second location spaced-apart from the transceiver for supplying a second media therefrom;

(d) connecting a first transponder to the first tray, the first transponder having data stored therein indicative of the type of first media, the first transponder capable of receiving the first electromagnetic field to power said first transponder and with said first transponder generating a second electromagnetic field in response to the first electromagnetic field received thereby, the second electromagnetic field generated by the first transponder being sensed by the transceiver and characteristic of the data stored in the first transponder; and (e) connecting a second transponder to the second tray, the second transponder having data stored therein indicative of type of the second media, the second transponder capable of receiving the first electromagnetic field to power said second transponder and with said second transponder generating another second electromagnetic field in response to the first electromagnetic field received thereby, the second electromagnetic field generated by the second transponder being sensed by the transceiver and characteristic of the data stored in the second transponder wherein the provided transceiver is adapted to selectively poll each transponder to obtain data from each transponder and associates each transponder with one of the first and second locations to determine the type of media disposed in the media supply trays at the first and second locations.

14. The method of claim 13, (a) wherein the step of connecting a first transponder comprises the step of connecting a first transponder having a first read/write memory; and (b) wherein the step of connecting a second transponder comprises the step of connecting a second transponder having a second read/write memory.

15. The method of claim 13, further comprising the step of providing a laser printhead for thermally activating the second media.

16. A method of assembling a printer adapted to sense data characteristic of the type of media disposed therein, comprising the steps of:

(a) providing a printhead;

(b) providing a transceiver disposed in association with the printhead for transmitting a first electromagnetic field and for sensing a second electromagnetic field;

(c) disposing a first media supply tray at a first location spaced-apart from the transceiver, the first tray having a supply of a first media therein in the form of cut sheets;

(d) disposing a second media supply tray at a second location spaced-apart from the transceiver, the second tray having a supply of a second media in the form of cut sheets; and (e) integrally connecting a first transponder to the first tray, the first transponder having data stored therein indicative of type of the first media, the first transponder capable of receiving the first electromagnetic field to power said first transponder and with said first transponder generating the second electromagnetic field in response to the first electromagnetic field received thereby, the second electromagnetic field being sensed by the transceiver and characteristic of the data stored in the first transponder; and (f) integrally connecting a second transponder to the second tray, the second transponder having data stored therein indicative of type of the second media, the second transponder capable of receiving the first electromagnetic field to power said second transponder and with said second transponder generating another second electromagnetic field in response to the first electromagnetic field received thereby, the second electromagnetic field generated by the second transponder being sensed by the transceiver and characteristic of the data stored in the second transponder, wherein the provided transceiver is adapted to selectively poll each transponder to obtain data from each transponder and associates each transponder with one of the first and second locations transponder to determine the type of media disposed in the media supply tray at the first location and the type of media disposed in the media supply tray at the second location.

17. The method of claim 16, (a) wherein the first transponder has a first read/write memory semiconductor chip; and (b) wherein the second transponder has a second read/write memory semiconductor chip.

18. The method of claim 16, wherein the transceiver is capable of transmitting the first electromagnetic fields at a predetermined first radio frequency.

19. The method of claim 18, wherein the steps of connecting the first transponder and the second transponder comprises the steps of connecting the first transponder and the second transponder, so that each of the first transponder and second transponder is capable of individually transmitting the second electromagnetic field at a predetermined second radio frequency.

20. The method of claim 16, wherein the step of providing a printhead comprises the step of providing is a laser printhead for thermally activating the second media.

21. A method of assembling a printer adapted to sense data characteristic of the type of media disposed therein, comprising the steps of:

(a) providing a laser printhead;

(b) providing a transceiver in association with the printhead for transmitting a first electromagnetic field of a predetermined first radio frequency and for sensing a second electromagnetic field of a predetermined second radio frequency;

(c) disposing a receiver supply tray at a first location spaced-apart from the transceiver, the receiver supply tray having a supply of a receiver in the form of cut sheets to be supplied therefrom;

(d) disposing a donor supply tray at a second location spaced-apart from the transceiver, the donor supply tray having a supply of a donor in the form of cut sheets to be supplied therefrom, the donor capable of being thermally activated by the laser printhead;

(e) integrally connecting a first transponder to the receiver supply tray, the first transponder having a first read/write memory semiconductor chip with encoded data stored therein indicative of type of receiver, the first transponder capable of receiving the first electromagnetic field to selectively power the first read/write chip and capable of generating the second electromagnetic field as the first read/write chip is selectively powered, the second electromagnetic field generated by the first read/write chip being characteristic of the data stored in the first read/write chip so that the data is subsumed in the second electromagnetic field generated by the first read/write chip; and (f) integrally connecting a second transponder to the donor supply tray, the second transponder having a second read/write semiconductor chip with encoded data stored therein for each sheet of donor material indicative of type of donor the second read/write chip capable of receiving the first electromagnetic field to selectively power the second read/write chip and capable of generating another second electromagnetic field as the second read/write chip is selectively powered, the second electromagnetic field being characteristic of the data stored in the second read/write chip so that the data is subsumed in the second electromagnetic field generated by the second read/write chip, whereby the transceiver senses the second electromagnetic fields as the first transponder and the second transponder generate their respective second electromagnetic fields; and (g) connecting a microprocessor to the printhead and the transceiver for controlling the printhead in accordance with the data subsumed in the second electromagnetic fields received by the transceiver, wherein said transceiver selectively polls each transponder to obtain data from each transponder and associates each transponder with one of the first location and second location to determine the type of media disposed in the media supply tray at the first location and the type of media disposed in the media supply tray at the second location.

22. A media supply adapted to allow a printer to sense data characteristic of the type of media in the media supply, comprising:

(a) a first media supply tray for supplying a first media therefrom at a first location in the media supply;

(b) a second media supply tray associated with said first tray for supplying a second media therefrom at a second location in the media supply;

(c) a transceiver spaced-apart from said first tray and said second tray for transmitting a first electromagnetic field and for sensing a second electromagnetic field; p1 (d) a first transponder coupled to said first tray and having a first memory with data stored therein indicative of the type of first media said first transponder capable of receiving the first electromagnetic field to power said first transponder and with said first transponder generating a second electromagnetic field in response to the first electromagnetic field received thereby, the second electromagnetic field generated by the first transponder being sensed by said transceiver and characteristic of the data stored in said first memory; and (e) a second transponder coupled to said second tray and having a second memory with data stored therein indicative of the type of second media, said second transponder capable of receiving the first electromagnetic field to power said second transponder and with said second transponder generating another second electromagnetic field in response to the first electromagnetic field received thereby, the second electromagnetic field generated by the second transponder being sensed by said transceiver and characteristic of the data stored in said second memory; and wherein said transceiver selectively polls each transponder to obtain data from each transponder and associates each transponder with one of the first location and the second location determine the type of media disposed in the media supply tray at the first location and the type of media disposed in the media supply tray at the second location.

23. The media supply of claim 22, wherein each of said first transponder and said second transponder further comprise a read/write memory semi-conductor chip.

24. The media supply of claim 22, wherein the first electromagnetic field is generated at a predetermined first radio frequency.

25. The media supply of claim 24, wherein each second electromagnetic field is generated at a predetermined second radio frequency.

26. A media supply adapted to allow a printer to sense data characteristic of the type of a media in the media supply, comprising:

(a) a first media supply tray for supplying a receiver media therefrom at a first location in the media supply;

(b) a second media supply tray for supplying a donor media therefrom at a second location in the media supply;

(c) a transceiver disposed proximate said first tray body and said second tray body for transmitting a first electromagnetic field of a predetermined first radio frequency and for sensing a second electromagnetic field of a predetermined second radio frequency;

(d) a first transponder integrally connected to said first tray body and having a first read/write memory semiconductor chip encoded with data stored therein indicative of type of receiver media, said first transponder capable of receiving the first electromagnetic field to selectively power said first chip and generating the second electromagnetic field as said first chip is selectively powered, the second electromagnetic field generated by the first chip being characteristic of the data stored in said first chip; and (e) a second transponder integrally connected to said second tray body and having a first read/write memory semiconductor chip encoded with data stored therein indicative of the type of donor media said second transponder capable of receiving the first electromagnetic field to selectively power said second chip and generating another second electromagnetic field as said second chip is selectively powered, the second electromagnetic field generated by the second chip being characteristic of the data stored in said second chip, wherein said transceiver selectively polls each transponder to obtain data from each transponder and associates each transponder with one of the first location and the second location to determine the type of media disposed in the media supply tray at the first location and the type of media disposed in the media supply tray located at the second location.

27. A method of assembling a media supply adapted to allow a printer to sense data characteristic of the type of a media in the media supply, comprising the steps of:

(a) providing more than one tray body each supplying a media therefrom at a separate location in the media supply;

(b) disposing a transceiver spaced-apart from each of the more than one tray body for transmitting a first electromagnetic field and for sensing a second electromagnetic field; and (c) coupling a transponder to each of the more than one tray body, the transponder having a memory with data stored therein indicative of the type of media, the transponder capable of receiving the first electromagnetic field to power said transducer and with said transponder generating the second electromagnetic field in response to the first electromagnetic field received thereby, the second electromagnetic field generated by each transponder being sensed by the transceiver and characteristic of the data stored in the memory, wherein the provided transceiver is adapted to selectively poll each transponder to obtain data from each transponder and associates each transponder with one of the media supply tray locations to determine the type of media disposed in the media supply tray at each media supply tray location.

28. A method of assembling a media supply adapted to allow a printer to sense data characteristic of the type of a media in the media supply, comprising the steps of:

(a) providing a first media supply tray at a first location for supplying a first media therefrom;

(b) providing a second media supply tray at a second location for supplying a second media therefrom;

(c) disposing a transceiver spaced-apart from the first media supply tray and the second media supply tray the transceiver transmitting a first electromagnetic field and sensing a second electromagnetic field;

(d) coupling a first transponder to the first media supply tray, the first transponder having a first memory with data stored therein indicative of type of first media, the first transponder capable of receiving the first electromagnetic field to power said first transponder and with said first transponder generating a second electromagnetic field in response to the first electromagnetic field received thereby, the second electromagnetic field generated by the first transponder being sensed by the transceiver and characteristic of the data stored in the first memory; and (e) coupling a second transponder to the second media supply tray, the second transponder having a second memory with data stored therein indicative of type of second media, the second transponder capable of receiving the first electromagnetic field to power said second transponder and with said second transponder generating another second electromagnetic field in response to the first electromagnetic field received thereby, the second electromagnetic field generated by the second transponder being sensed by the transceiver and characteristic of the data stored in the second memory, wherein the provided transceiver is adapted to selectively poll each transponder to obtain data from each transponder and associates each transponder with one of the first location and the second location to determine the type of media disposed in the media supply tray at the first location and the type of media disposed in the media supply tray at the second location.

29. The method of claim 28, wherein the steps of coupling the first transponder and the second transponder comprises the steps of coupling a first transponder having a first read/write memory semiconductor chip and coupling a transponder having a second read/write memory semiconductor chip.

30. The method of claim 28, wherein the step of providing a transceiver comprises the step of providing a transceiver adapted to transmit the first electromagnetic field at a predetermined first radio frequency.

31. The method of claim 30, wherein the steps of coupling a first transponder and a second transponder comprise the steps of coupling a first transponder and a second transponder adapted to generate the second electromagnetic field at a predetermined second radio frequency.

32. A method of assembling a media supply adapted to allow a printer to sense data characteristic of the type of a media in the media supply, comprising the steps of:

(a) providing a first media supply tray at a first location for supplying a receiver media therefrom;

(b) providing a second media supply tray at a second location for supplying a donor media therefrom;

(c) a transceiver disposed proximate the first media supply tray and the second media supply tray for transmitting a first electromagnetic field of a predetermined first radio frequency and for sensing a second electromagnetic field of a predetermined second radio frequency;

(d) a first transponder having a first read/write memory semiconductor chip integrally connected to the first media supply tray and having encoded data stored therein indicative of type of receiver media, the first transponder capable of receiving the first electromagnetic field to selectively power the chip and generating the second electromagnetic field as the chip is selectively powered; and (e) a second transponder have a second read/write memory semiconductor chip integrally connected to the second media supply tray and having encoded data stored therein indicative of type of donor media the second transponder capable of receiving the first electromagnetic field to selectively power the second chip and generating another second electromagnetic field as the second chip is selectively powered, the second electromagnetic field generated by the first chip and by the second chip being characteristic of the data respectively stored in the first chip and the second chip, wherein said transceiver selectively polls each transponder to obtain data from each transponder and associates each transponder with one of the first location and second location to determine the type of media disposed in the media supply tray at the first location and the type of media disposed in the media supply tray at the second location.

33. A method for determining the type of media in a media supply having more than one media supply trays located in the media supply and each tray having a transponder with a memory containing data that characterizes the media stored in the tray, the method comprising the steps of:

transmitting a signal to each of the media supply locations, detecting a signal from the transponder in that location, said signal indicating the type of media and associating the signal with the media supply tray in that location.

34. The method of claim 33 wherein a transceiver is used to perform the sending and receiving steps and further comprising the step of moving the transceiver between positions for communicating with transponders in each of the locations.

* * * * *